US012429806B2

(12) United States Patent
Tanio

(10) Patent No.: US 12,429,806 B2
(45) Date of Patent: Sep. 30, 2025

(54) SHEET TRANSPORT DEVICE INCLUDING A SENSOR THAT DETECTS POSITIONS OF RECORDING SHEET BEING TRANSPORTED THROUGH TRANSPORT ROUTE, AND SWITCHING NAIL, AND IMAGE FORMING APPARATUS

(71) Applicant: KYOCERA Document Solutions Inc., Osaka (JP)

(72) Inventor: Koji Tanio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 224 days.

(21) Appl. No.: 18/515,478

(22) Filed: Nov. 21, 2023

(65) Prior Publication Data

US 2024/0176273 A1 May 30, 2024

(30) Foreign Application Priority Data

Nov. 29, 2022 (JP) ................................ 2022-190607

(51) Int. Cl.

*B65H 29/60* (2006.01)
*B65H 7/02* (2006.01)
*G03G 15/00* (2006.01)

(52) U.S. Cl.

CPC .......... *G03G 15/6555* (2013.01); *B65H 7/02* (2013.01); *G03G 15/6529* (2013.01); *B65H 29/60* (2013.01); *B65H 2511/528* (2013.01); *B65H 2513/52* (2013.01); *G03G 2215/00548* (2013.01); *G03G 2215/00675* (2013.01)

(58) Field of Classification Search

CPC .......... G03G 15/6555; G03G 15/6529; G03G 2215/00548; G03G 2215/00675; B65H 7/02; B65H 29/58; B65H 29/60; B65H 2511/528

USPC ........................................ 271/302, 303, 304

See application file for complete search history.

(56) References Cited

U.S. PATENT DOCUMENTS 8,991,824 B2 * 3/2015 Suzuki .................. B65H 85/00 271/301
11,565,906 B2 * 1/2023 Ariga .................... B65H 43/04
11,726,424 B2 * 8/2023 Suzuki .................. B65H 5/062 271/301

FOREIGN PATENT DOCUMENTS

JP H04116061 A 4/1992

* cited by examiner

*Primary Examiner* — Leslie A Nicholson, III
(74) *Attorney, Agent, or Firm* — IP Business Solutions, LLC.

(57) ABSTRACT

A sheet transport device includes a first transport route, a roller, a second transport route, a switching nail, a lever, a sheet detection piece, a cam, an intermediate rotary member, a rotary member, a sensor, a driver, and a controller. The controller controls the driver to switch the switching nail between a first transport position and a second transport position, decides that the sheet is transported through first transport route, when the sheet detection piece retreats contacted by the sheet on the first transport route, with the switching nail being set to the first transport position, and the sensor detects that the rotary member is in the second posture, and decides that the switching nail has been switched from the first transport position to the second transport position, when the sensor detects that the rotary member is in the second posture, after the sheet has passed the sheet detection piece.

5 Claims, 18 Drawing Sheets

SHEET TRANSPORT DEVICE INCLUDING A SENSOR THAT DETECTS POSITIONS OF RECORDING SHEET BEING TRANSPORTED THROUGH TRANSPORT ROUTE, AND SWITCHING NAIL, AND IMAGE FORMING APPARATUS

INCORPORATION BY REFERENCE

This application claims priority to Japanese Patent Application No. 2022-190607 filed on Nov. 29, 2022, the entire contents of which are incorporated by reference herein.

BACKGROUND

The present disclosure relates to a sheet transport device that transports sheets, and an image forming apparatus including the sheet transport device. In particular, the disclosure relates to a technique to switch the transport direction of the sheet.

The image forming apparatus is configured to transport a recording sheet (an example of the sheet) to an image forming device through a first transport route, cause the image forming device to form an image of a document on the surface of the recording sheet, and deliver the recording sheet having the image formed thereon to an output tray via a delivery roller. When the image of the document is to be also formed on the back face of the recording sheet, the image forming apparatus performs switchback transport, including transporting the recording sheet to the delivery roller, stopping the delivery roller once and then rotating the delivery roller reversely, thereby transporting the recording sheet in the opposite direction. Then the recording sheet is returned to the first transport route through the second transport route, with the front and back faces reversed. Thereafter, the image forming device forms the image of the document on the back face of the recording sheet, and the recording sheet is delivered to the output tray, via the delivery roller.

Some of existing sheet transport devices are configured to transport the recording sheet from an introduction transport route to a reversing transport route, switch the sheet transport direction to the opposite direction through the reversing transport route, and transport the recording sheet from the reversing transport route to a delivery transport route. Such sheet transport devices include, for the purpose of switching the transport direction of the recording sheet, a first branch nail and a second branch nail that switch the sheet transport direction, at the branch point of the introduction transport route, the reversing transport route, and the delivery transport route, and also a roller for transporting the recording sheet in the opposite direction, provided on the reversing transport route.

SUMMARY

The disclosure proposes further improvement of the foregoing techniques.

In an aspect, the disclosure provides a sheet transport device including a first transport route, a roller, a second transport route, a switching nail, a lever, a sheet detection piece, a cam, an intermediate rotary member, a rotary member, a sensor, a driver, and a controller. The first transport route guides a sheet. The roller transports the sheet guided through the first transport route. The second transport route guides the sheet transported in an opposite direction by reverse rotation of the roller. The switching nail is supported by a first shaft parallel to a rotary shaft of the roller, to be set, by being made to reciprocatively rotate about the first shaft, to one of a first transport position for conducting the sheet guided through the first transport route to the roller, and a second transport position for conducting the sheet transported in the opposite direction by the reverse rotation of the roller, to the second transport route. The lever is protruding from the first shaft, in a direction orthogonal to the first shaft. The sheet detection piece is rotatably supported by a second shaft parallel to the first shaft, protruding to the first transport route, and configured to retreat from the first transport route by rotating about the second shaft, upon being contacted by the sheet transported through the first transport route. The cam is connected to the sheet detection piece via the second shaft, and rotates about the second shaft together with the sheet detection piece, when the sheet detection piece retreats from the first transport route. The intermediate rotary member is rotatably supported by a third shaft parallel to the first shaft, to rotate, when the switching nail is switched to the second transport position and the first shaft and the lever rotate, about the third shaft by being contacted by the rotating lever, thereby contacting the cam and causing the cam to rotate. The rotary member is rotatably supported by a fourth shaft parallel to the first shaft, to rotate, when the sheet detection piece retreats from the first transport route and the cam rotates, and when the switching nail is switched to the second transport position and the cam rotates, about the fourth shaft by being contacted by the rotating cam, and be displaced between a first posture of being spaced from the cam, and a second posture of being in contact with the cam. The sensor detects that the rotary member is in the second posture of being in contact with the cam. The driver switches the switching nail to one of the first transport position and the second transport position, by causing the switching nail to reciprocatively rotate about the first shaft. The controller includes a processor, and is configured, when the processor executes a control program, to switch the switching nail to one of the first transport position and the second transport position, by controlling the driver, decide that the sheet is transported through first transport route, when the sheet detection piece retreats by being contacted by the sheet transported through the first transport route, with the switching nail being set to the first transport position, and the sensor detects that the rotary member is in the second posture, and decide that the switching nail has been switched from the first transport position to the second transport position, when the sensor detects that the rotary member is in the second posture, after the sheet has passed the sheet detection piece.

In another aspect, the disclosure provides an image forming apparatus including the foregoing sheet transport device, and an image forming device. The image forming device forms an image on a sheet transported by the sheet transport device.

DETAILED DESCRIPTION

Figure 1:
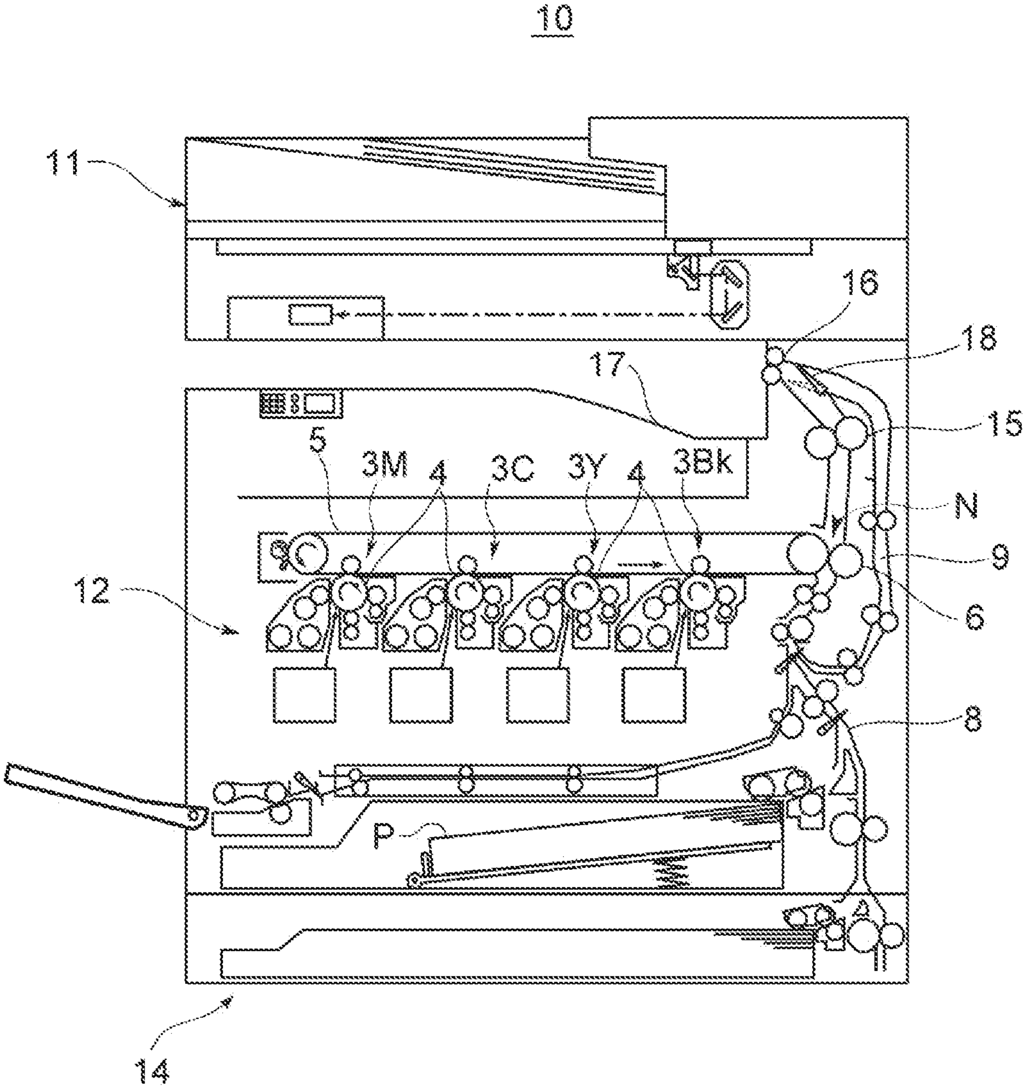
FIG. 1 is a cross-sectional view showing an image forming apparatus, incorporated with a sheet transport device according to an embodiment of the disclosure.

Hereafter, an embodiment of the disclosure will be described, with reference to the drawings. FIG. 1 is a cross-sectional view showing an image forming apparatus 10, incorporated with a sheet transport device 20 according to the embodiment of the disclosure. As shown in FIG. 1, the image forming apparatus 10 includes an image reading device 11 and an image forming device 12.

The image reading device 11 includes an image sensor, such as a CCD sensor or a contact image sensor, which optically reads an image of a document. The image reading device 11 converts an analog output from the image sensor into a digital signal, and generates image data representing the image of the document.

The image forming device 12 serves to print the image represented by the image data, on a recording sheet. The image forming device 12 includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged and exposed, to thereby form an electrostatic latent image on the surface of the photoconductor drum 4, and then the electrostatic latent image on the surface of the photoconductor drum 4 is developed into a toner image, which is transferred to an intermediate transfer belt 5. As result, a colored toner image is formed on the intermediate transfer belt 5. The colored toner image is transferred, as secondary transfer, to the recording sheet P transported from a sheet feeding device 14 along a first transport route 8, at a nip region N between the intermediate transfer belt 5 and a secondary transfer roller 6.

A fixing device 15 heats and presses the recording sheet P, to fix the toner image onto the recording sheet P, by thermal compression. The recording sheet P, having the toner image fixed thereon, is delivered to an output tray 17, via a delivery roller 16.

When the image of the document is to be also recorded on the back face of the recording sheet P, switchback transport is performed, including stopping the delivery roller 16 once, when the recording sheet P reaches the delivery roller 16, beyond which the output tray 17 is located, and then rotating the delivery roller 16 reversely, thereby transporting the recording sheet P in the opposite direction. At the same time that the switchback transport is performed, the position of a switching nail 18, provided at the branch point between the first transport route 8 and a second transport route 9, is switched, so that the recording sheet P is guided to the second transport route 9, from the delivery roller 16. The recording sheet P is returned to the first transport route 8 through the second transport route 9, with the front and back faces reversed. Then the image forming device 12 forms the image of the document on the back face of the recording sheet P. The recording sheet P, having the image formed on the back face thereof, is delivered to the output tray 17, via the delivery roller 16.

Figure 2A:
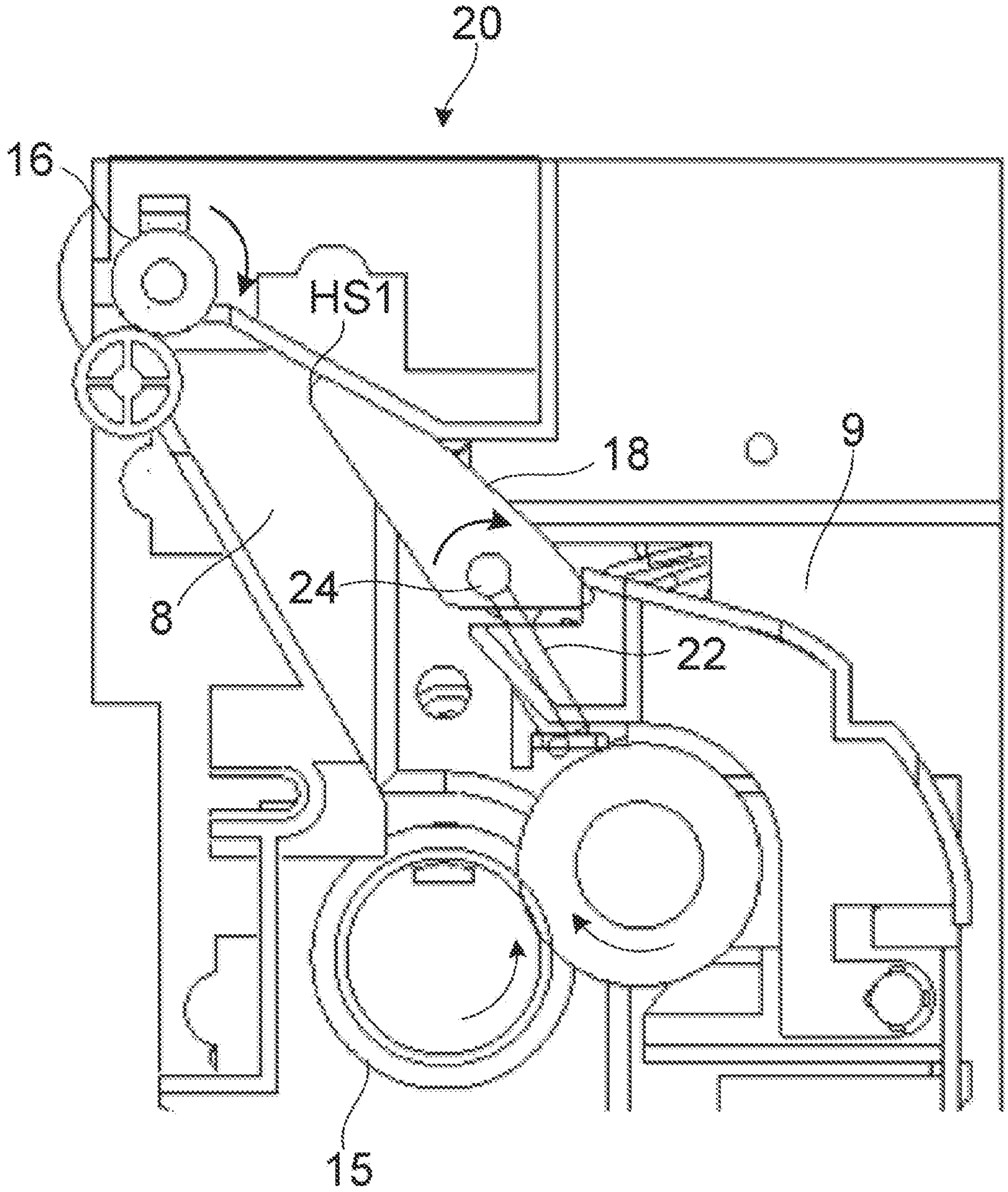
FIG. 2A is a side view showing a first transport position of a switching nail, assumed when a recording sheet is to be guided to a delivery roller.
Figure 2B:
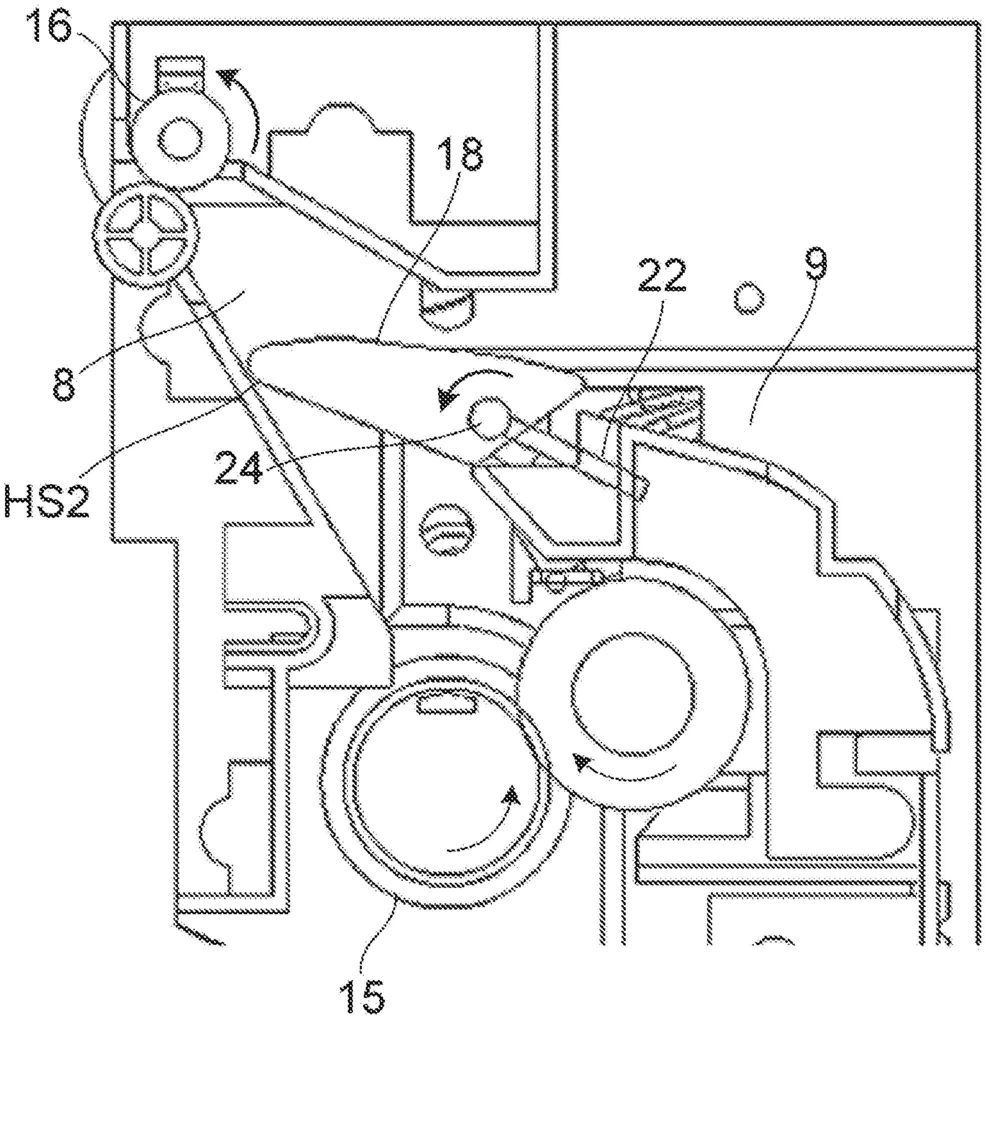
FIG. 2B is a side view showing a second transport position of the switching nail, assumed when guiding the recording sheet being transported in the opposite direction by the delivery roller.

FIG. 2A and FIG. 2B are enlarged side views showing the delivery roller 16 and the switching nail 18 of the sheet transport device 20. As shown in FIG. 2A and FIG. 2B, the switching nail 18 is supported by a shaft 24 (exemplifying the first shaft in the disclosure) parallel to the delivery roller 16. The switching nail 18 is positioned at a first transport position HS1 or a second transport position HS2, by being switched therebetween. When the switching nail 18 is positioned at the first transport position HS1, the recording sheet P is transported to the delivery roller 16 from the fixing device 15 through the first transport route 8, and delivered to the output tray 17 (see FIG. 1) via the delivery roller 16.

When the switchback transport is to be performed as above, the delivery roller 16 is once stopped while transporting the recording sheet P, and then made to rotate reversely. In addition, the switching nail 18 is switched from the first transport position HS1 to the second transport position HS2. The recording sheet P is transported in the opposite direction by the delivery roller 16, and conducted to the second transport route 9 by the switching nail 18, from the branch point between the first transport route 8 and the second transport route 9. The recording sheet P is then returned to the first transport route 8 through the second transport route 9, with the front and back faces reversed.

Figure 3:
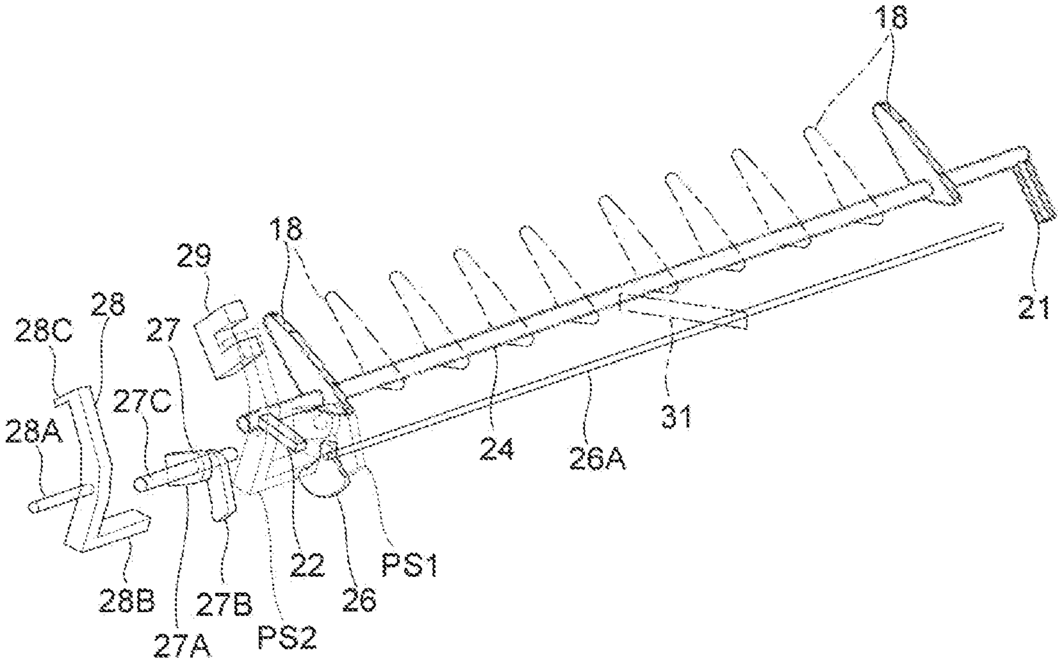
FIG. 3 is a perspective view showing a plurality of switching nails, shafts supporting the respective switching nails, and related parts.

FIG. 3 is a perspective view showing the switching nails 18, the shafts 24, and the related parts. As shown in FIG. 3, a plurality of switching nails 18 are aligned at predetermined intervals in the width direction of the recording sheet P, and the switching nails 18 are each fixed to the shaft 24. At an end portion of the shaft 24, a first lever 21 is fixed so as to protrude in the direction orthogonal to the shaft 24. When the first lever 21 reciprocatively rotates about the shaft 24, the switching nails 18 also reciprocatively rotate, interlocked with the shaft 24. Thus, the switching nails 18 can be switched between the first transport position HS1 and the second transport position HS2.

Figure 4A:
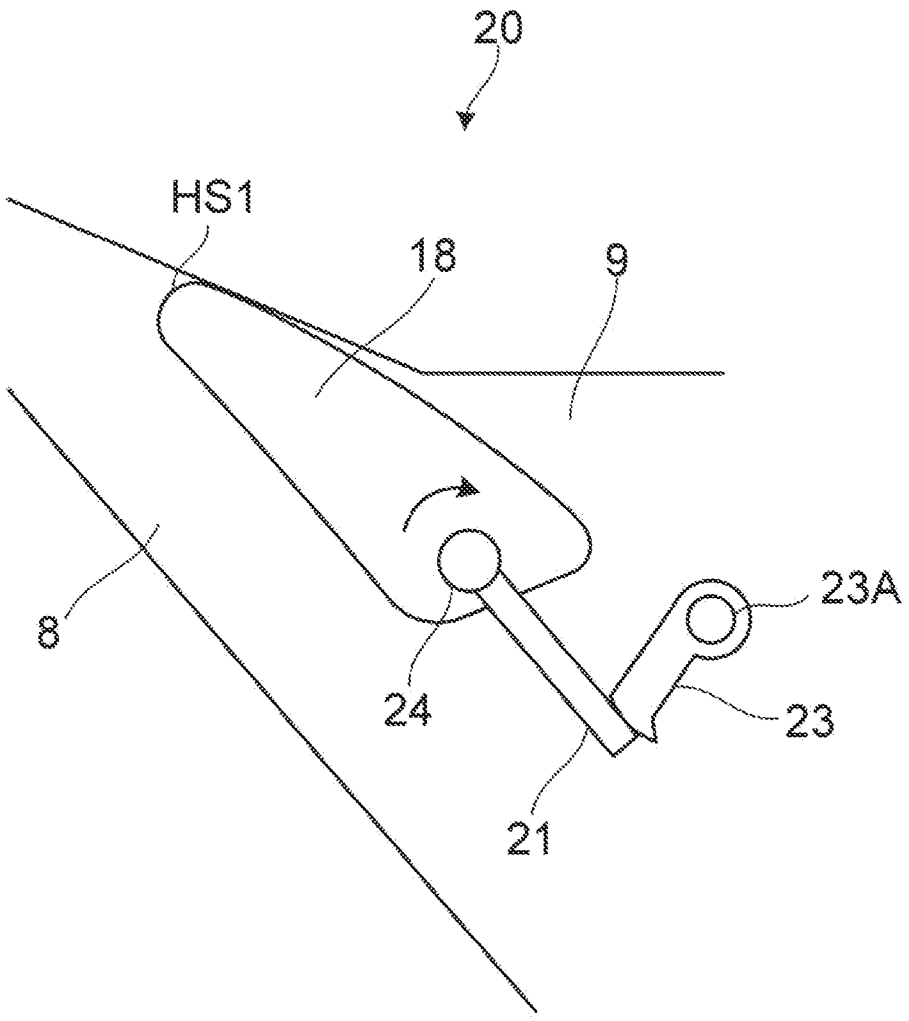
FIG. 4A is a side view showing the switching nail moved to the first transport position, by a rotary cam.
Figure 4B:
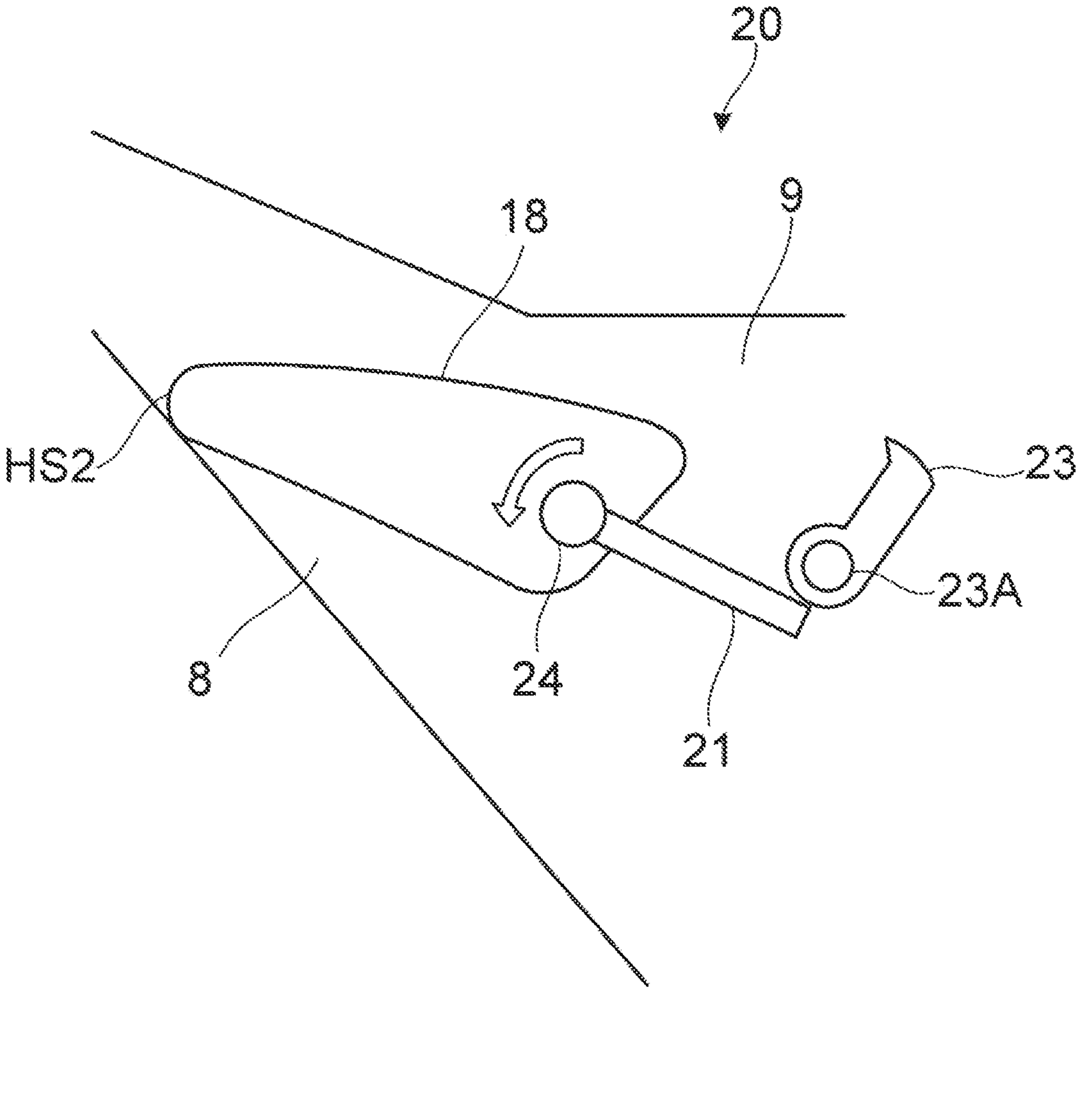
FIG. 4B is a side view showing the switching nail moved to the second transport position, by the rotary cam.

As shown in FIG. 4A and FIG. 4B, a rotary cam 23 is provided in the proximity of the first lever 21. The rotative driving force of a drive motor 42 (see FIG. 12) is transmitted to a shaft 23A of the rotary cam 23, via a gear unit. Accordingly, the shaft 23A and the rotary cam 23 can be made to rotate.

The switching nails 18 are supported by the shaft 24, and biased by a spring in the counterclockwise direction. When the peripheral edge of the rotary cam 23 pushes the first lever 21 as shown in FIG. 4A, the switching nails 18 rotate in the clockwise direction against the biasing force of the spring, thus to be positioned at the first transport position HS1. When the rotary cam 23 rotates by 180 degrees as shown in FIG. 4B, the switching nails 18 are made to rotate in the counterclockwise direction by the biasing force of the spring, thus to be positioned at the second transport position HS2.

Figure 5:
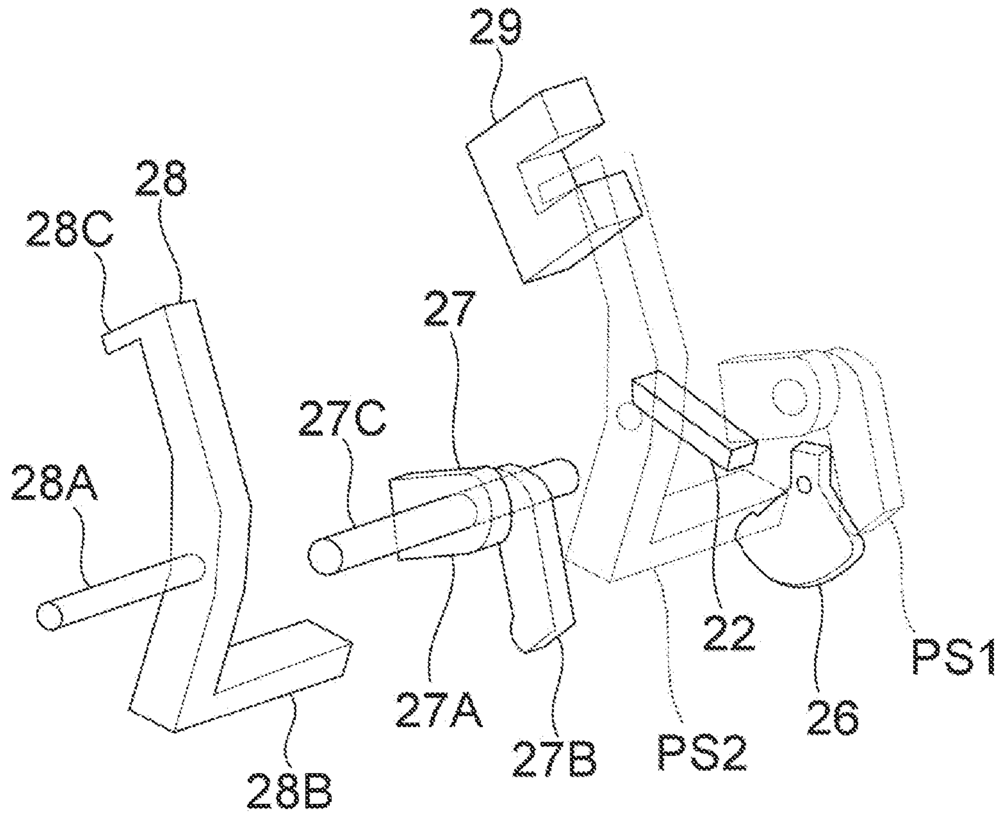
FIG. 5 is a perspective view schematically showing a second lever fixed to the other end portion of the shaft supporting the switching nail, and related parts.

As shown in FIG. 3 and FIG. 5, on the other end portion of the shaft 24 supporting the switching nails 18, a second lever 22, protruding in the direction orthogonal to the shaft 24, is fixed. A swing cam 26, an intermediate rotary member 27, a rotary member 28, and a rotational position sensor 29 are provided in the proximity of the second lever 22.

The intermediate rotary member 27 and the rotational position sensor 29 are actually located at positions PS1 and PS2 respectively, which are indicated by dot lines. In FIG. 5, the intermediate rotary member 27 and the rotational position sensor 29 are spaced from the respective positions PS1 and PS2, along the shaft 24.

The swing cam 26 (exemplifying the cam in the disclosure) is fixed to an end portion of a shaft 26A (exemplifying the second shaft in the disclosure). At a generally central position of the shaft 26A, a sheet detection piece 31 is provided, so as to protrude toward the first transport route 8 and cross the same. The shaft 26A serves to connect the swing cam 26 and the sheet detection piece 31, and is rotatably supported in the orientation parallel to the shaft 24 of the switching nails 18.

The intermediate rotary member 27 serves to connect a first contact piece 27A and a second contact piece 27B to each other, via a shaft 27C (exemplifying the third shaft in the disclosure). The shaft 27C is rotatably supported in the orientation parallel to the shaft 24 shaft 24.

The rotary member 28 is supported so as to rotate about a shaft 28A (exemplifying the fourth shaft in the disclosure) parallel to the shaft 24. At the lower end of the rotary member 28, a contact bar 28B is formed so as to protrude parallel to the shaft 28A. At the upper end of the rotary member 28, a detection piece 28C is formed so as to protrude in the counterclockwise direction about the shaft 28A.

The rotational position sensor 29 is an optical sensor including a light emitting element and a photodetector, opposed to each other. The rotational position sensor 29 detects the detection piece 28C formed at the upper end of the rotary member 28, when the detection piece 28C intrudes in the region between the light emitting element and the photodetector.

Figure 6:
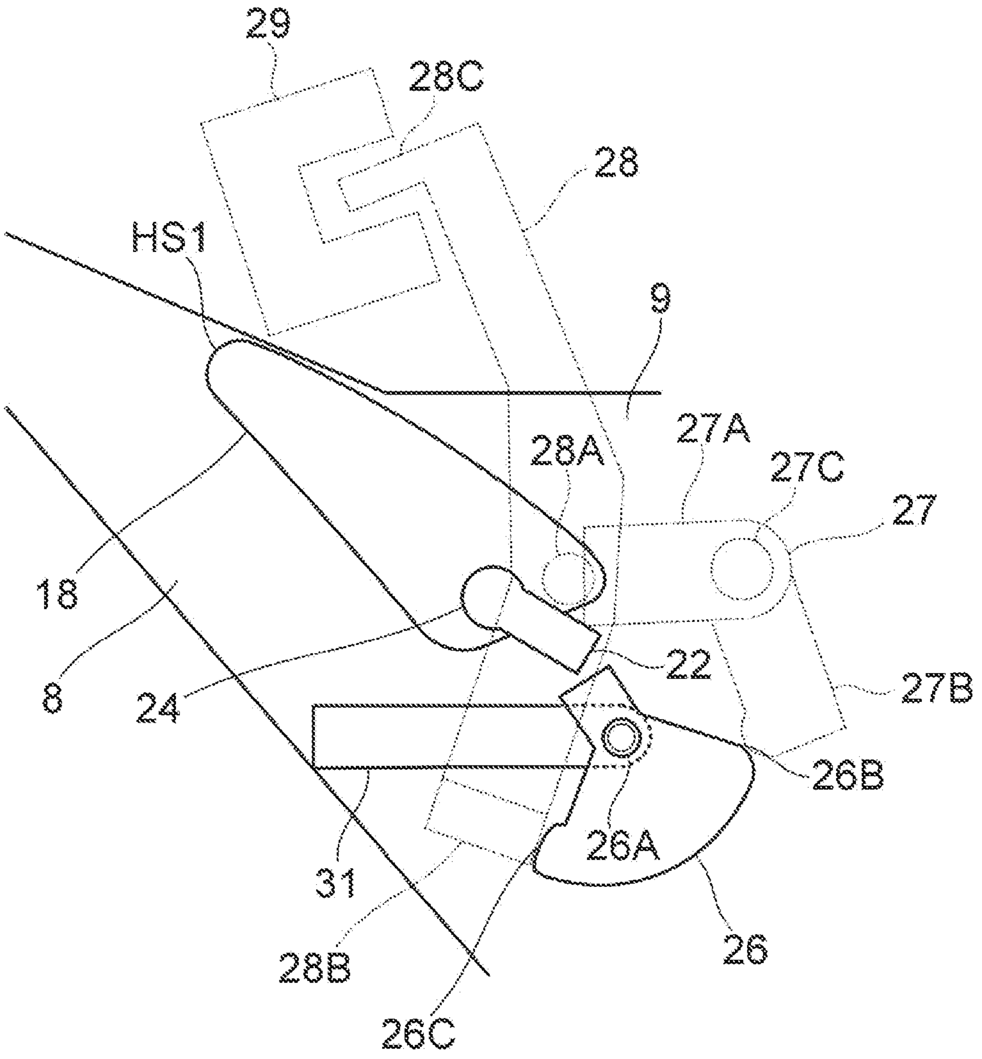
FIG. 6 is a side view schematically showing a sheet detection piece and related parts, in a state where the recording sheet is not being transported through the first transport route.
Figure 7A:
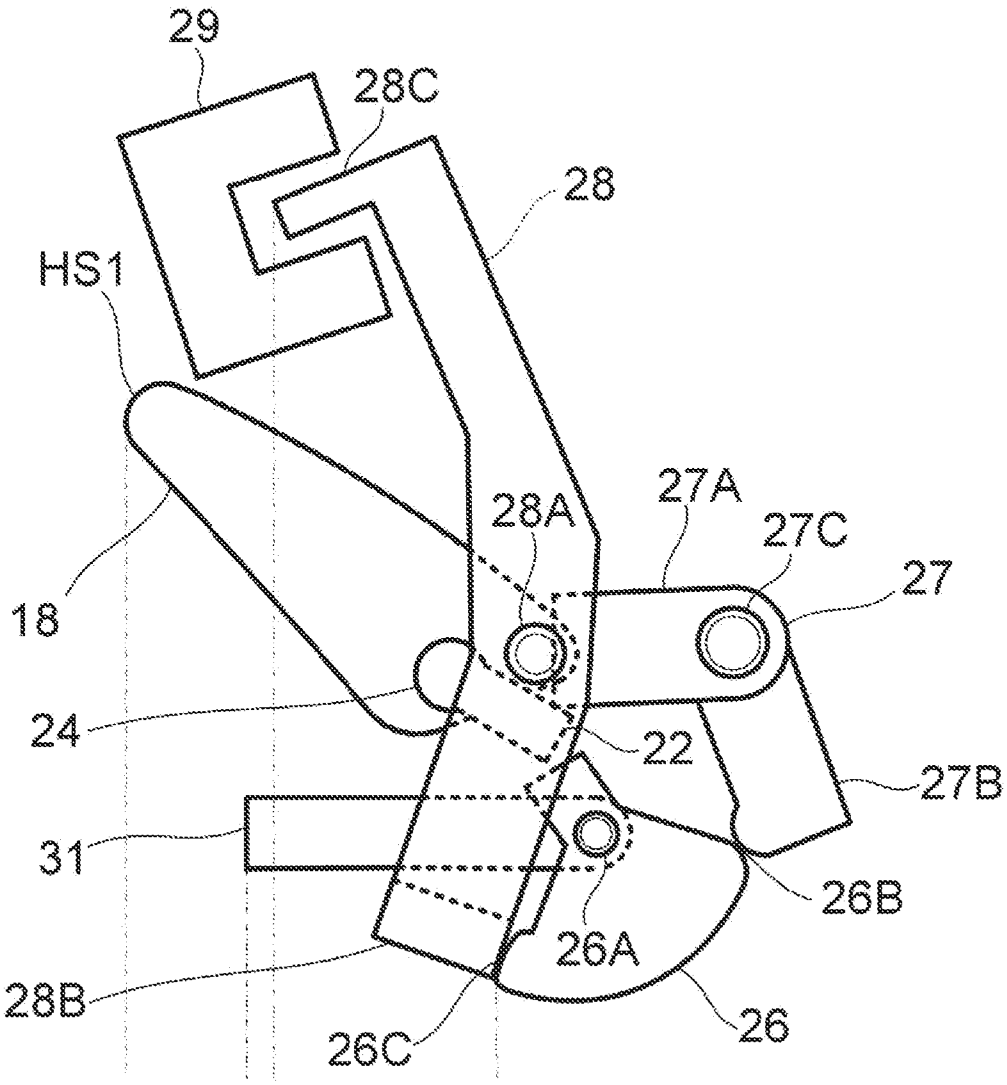
FIG. 7A and FIG. 7B are a side view and a plan view respectively, showing the sheet detection piece and the related parts, in the state shown in FIG. 6.
Figure 7B:
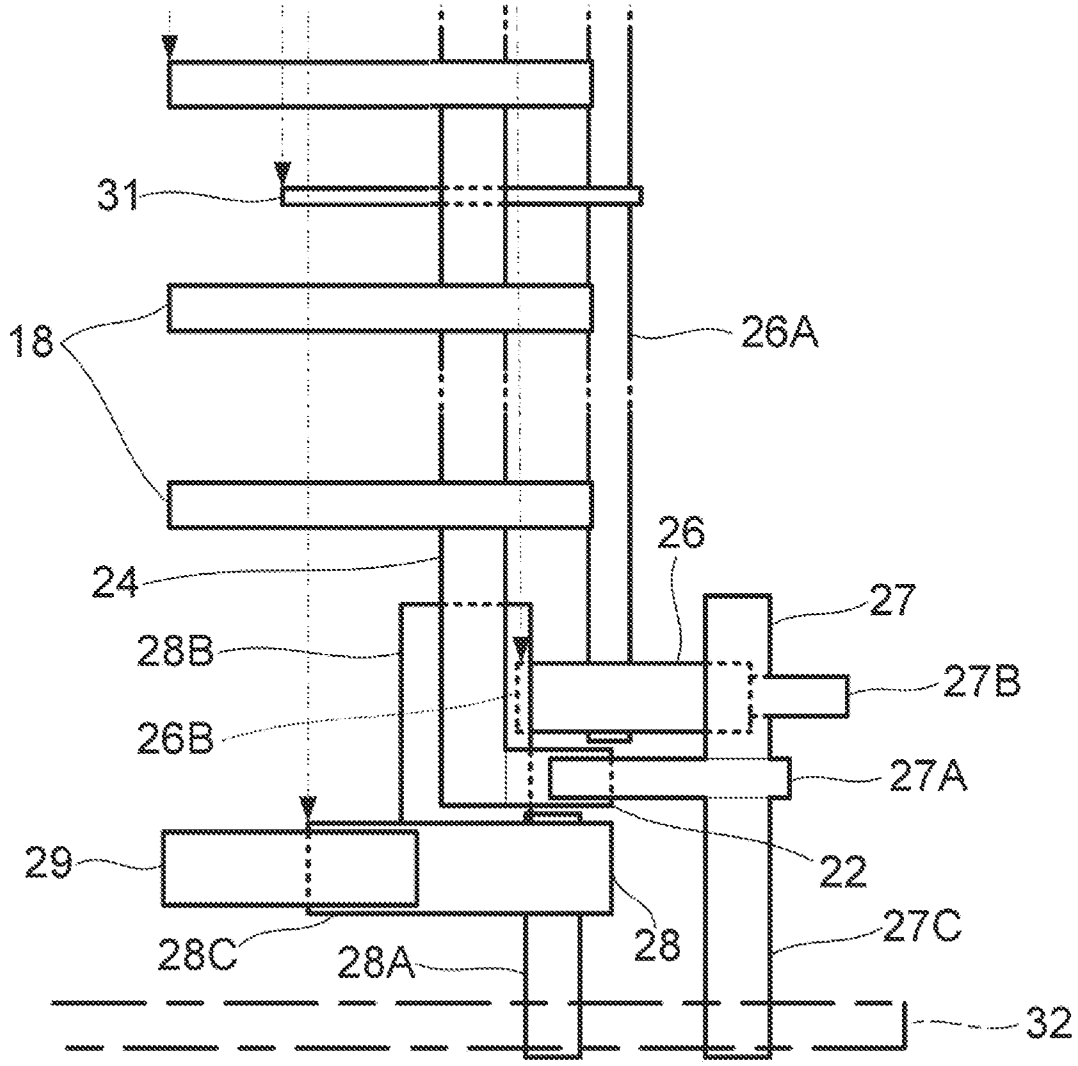

FIG. 6 is a side view schematically showing the sheet detection piece 31, the swing cam 26, the intermediate rotary member 27, the rotary member 28, and the rotational position sensor 29, in a state where the switching nails 18 have been shifted to the first transport position HS1, and the recording sheet is not being transported through the first transport route 8. FIG. 7A and FIG. 7B are a side view and a plan view respectively, showing the sheet detection piece 31, the swing cam 26, the intermediate rotary member 27, the rotary member 28, and the rotational position sensor 29, in the state shown in FIG. 6.

As shown in FIG. 6, FIG. 7A, and FIG. 7B, the swing cam 26 and the sheet detection piece 31 are fixed at the end portion and the generally central position respectively, of the shaft 26A parallel to the shaft 24 of the switching nails 18. The swing cam 26 and the sheet detection piece 31 are rotatably supported by the shaft 26A, and biased in the counterclockwise direction, by the self-weight. The sheet detection piece 31 is biased in the counterclockwise direction so as to protrude toward the first transport route 8, such that the distal end portion of the sheet detection piece 31 is in contact with the inner wall of the first transport route 8.

The shaft 27C of the intermediate rotary member 27 extends parallel to the shaft 24, and is rotatably supported by a frame 32 of the sheet transport device 20. The first contact piece 27A and the second contact piece 27B are fixedly connected to each other via the shaft 27C, with a spacing therebetween. The first contact piece 27A is positioned so as to contact the second lever 22 fixed to the other end portion of the shaft 24, when the switching nails 18 and the shaft 24 rotate. The second contact piece 27B is positioned so as to contact a peripheral edge 26B of the swing cam 26, when the swing cam 26, the sheet detection piece 31, and the shaft 26A rotate.

The shaft 28A of the rotary member 28 extends parallel to the shaft 24, and is rotatably supported by the frame 32 of the sheet transport device 20. The rotary member 28 is biased in the counterclockwise direction, by the self-weight. The contact bar 28B formed at the lower end of the rotary member 28 is in contact with a peripheral edge 26C of the swing cam 26, and the detection piece 28C formed at the upper end of the rotary member 28 is in the region between the light emitting element and the photodetector of the rotational position sensor 29. The posture of the rotary member 28 in this state will be defined as a first posture.

The rotational position sensor 29 detects the presence of the detection piece 28C formed at the upper end of the rotary member 28, located between the light emitting element and the photodetector.

Figure 8:
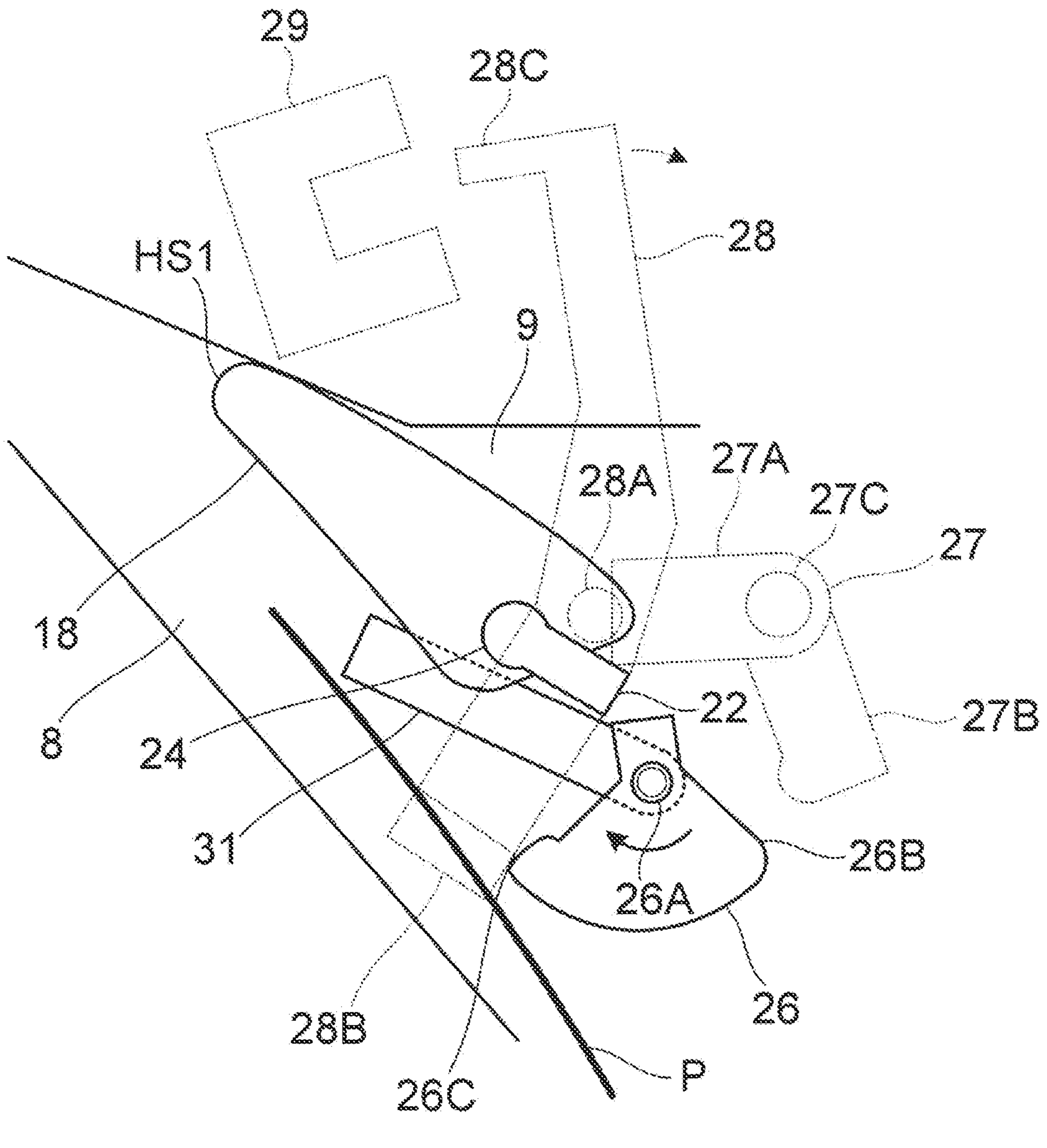
FIG. 8 is a side view schematically showing the sheet detection piece and the related parts, in a state where the recording sheet is being transported through the first transport route.
Figure 9A:
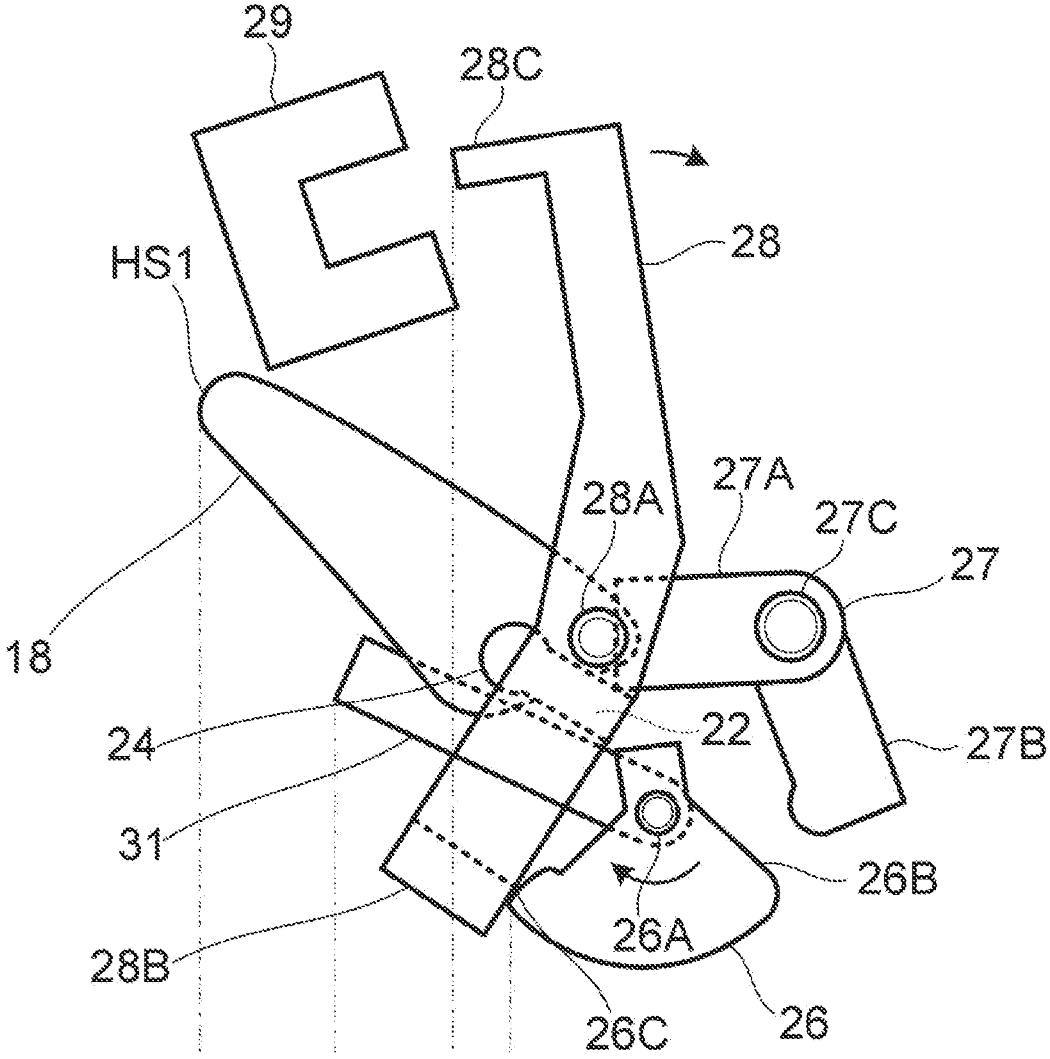
FIG. 9A and FIG. 9B are a side view and a plan view respectively, showing the sheet detection piece and the related parts, in the state shown in FIG. 8.
Figure 9B:
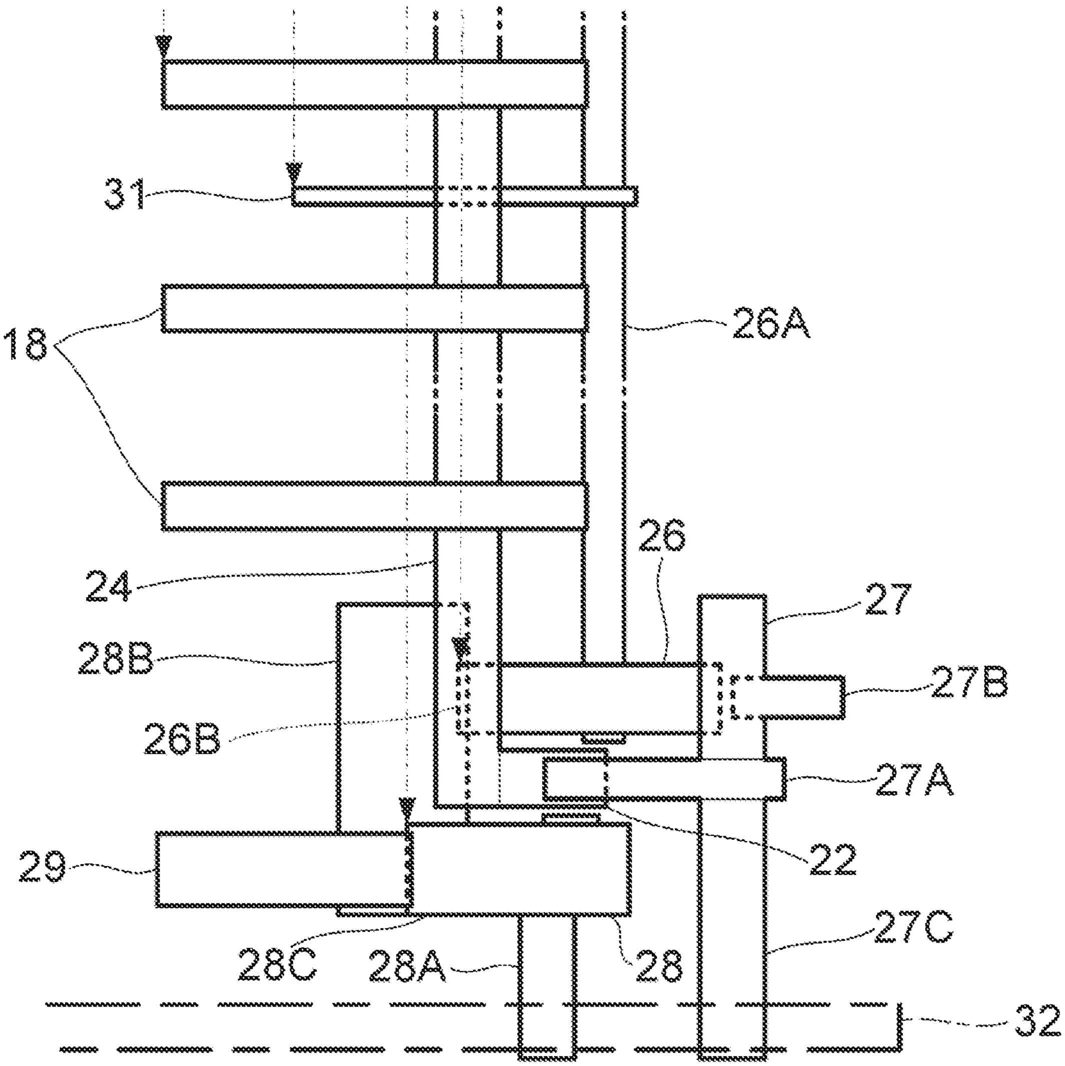

FIG. 8 is a side view schematically showing the sheet detection piece 31, the swing cam 26, the intermediate rotary member 27, the rotary member 28, and the rotational position sensor 29, in a state where the switching nails 18 have been shifted to the first transport position HS1, and the recording sheet is being transported through the first transport route 8. FIG. 9A and FIG. 9B are a side view and a plan view respectively, showing the sheet detection piece 31, the swing cam 26, the intermediate rotary member 27, the rotary member 28, and the rotational position sensor 29, in the state shown in FIG. 8.

As shown in FIG. 8, FIG. 9A, and FIG. 9B, when the recording sheet P is transported through the first transport route 8, the distal end portion of the sheet detection piece 31 contacts the recording sheet P, thus to be lifted up. Accordingly, the sheet detection piece 31 rotates in the clockwise direction together with the shaft 26A, and therefore the swing cam 26 also rotates in the clockwise direction.

Because of the rotation of the swing cam 26 in the clockwise direction, the peripheral edge 26C of the swing cam 26 pushes the contact bar 28B formed at the lower end of the rotary member 28. Accordingly, the rotary member 28 rotates in the clockwise direction about the shaft 28A, so that the detection piece 28C at the upper end of the rotary member 28 moves out of the region between the light emitting element and the photodetector of the rotational position sensor 29. The posture of the rotary member 28 in this state will be defined as a second posture.

The rotational position sensor 29 no longer detects the presence of the detection piece 28C at the upper end of the rotary member 28, which has gone out of the region between the light emitting element and the photodetector.

Figure 10:
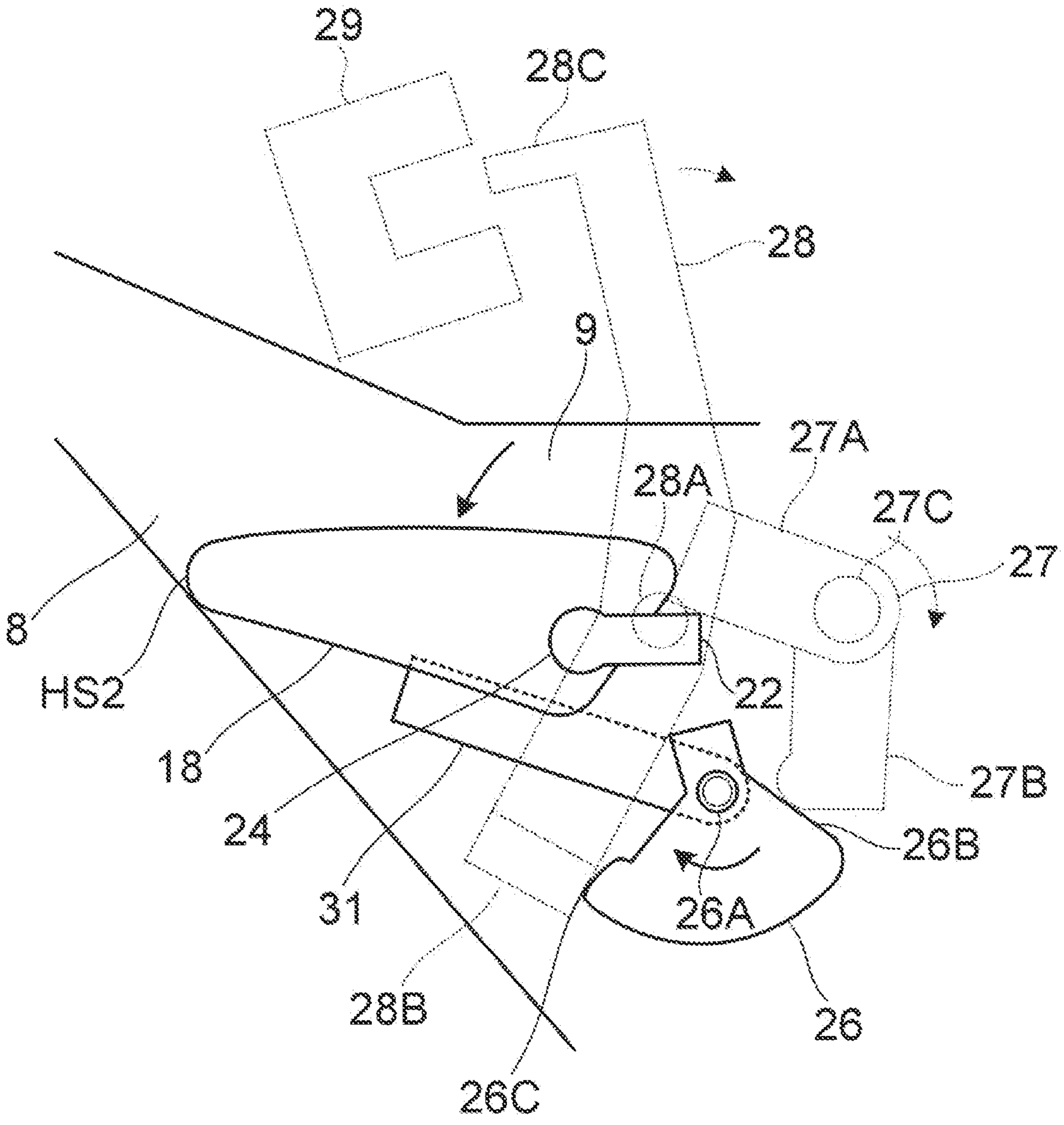
FIG. 10 is a side view schematically showing the sheet detection piece and the related parts, in a state where the switching nails have been moved from the first transport position to the second transport position.
Figure 11A:
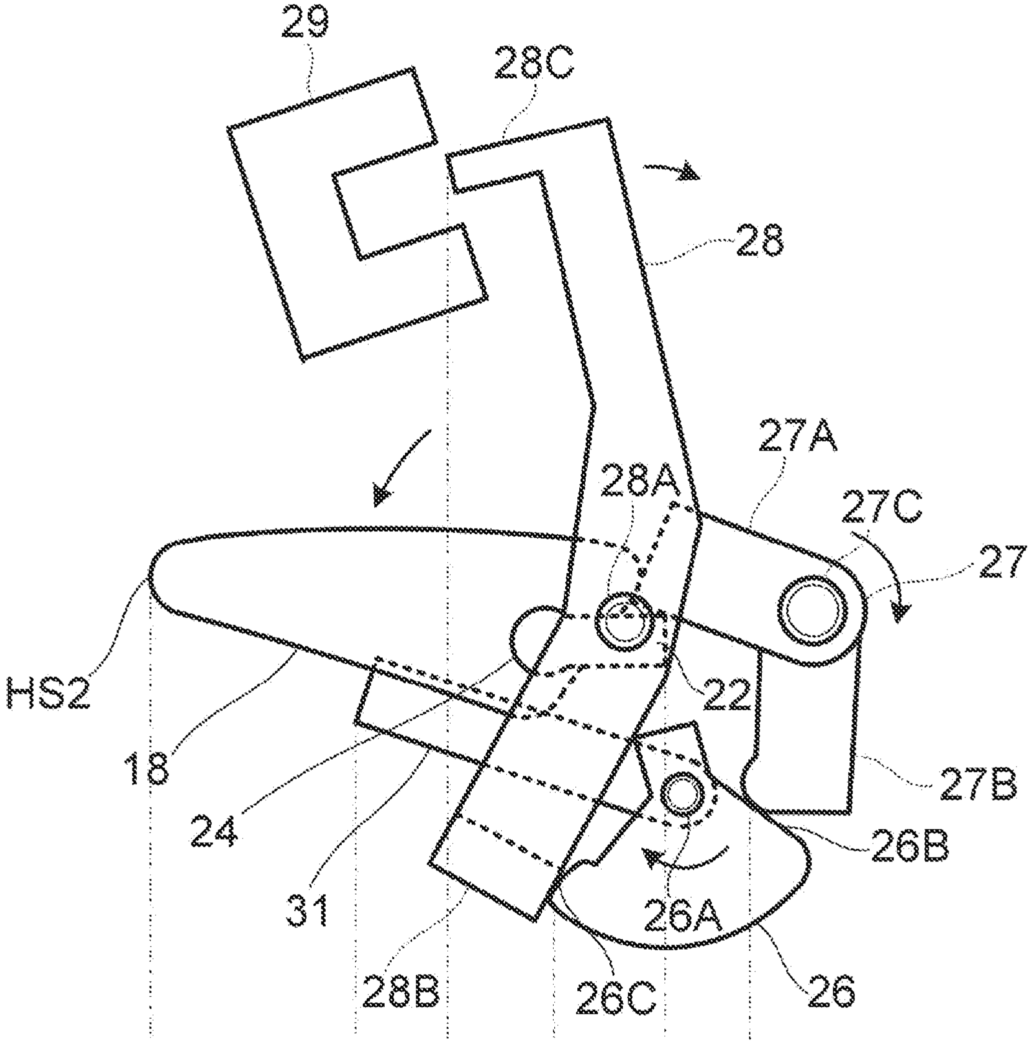
FIG. 11A and FIG. 11B are a side view and a plan view respectively, showing the sheet detection piece and the related parts, in the state shown in FIG. 10.
Figure 11B:
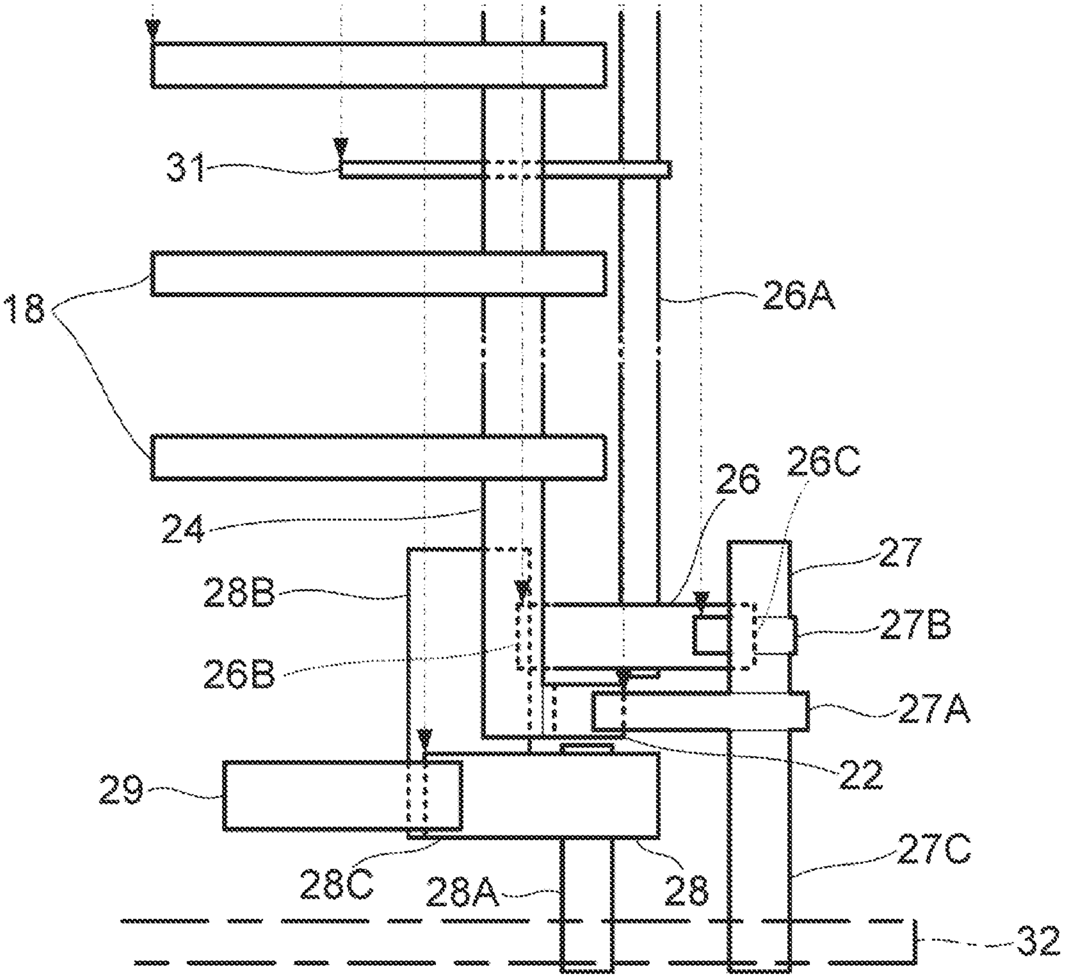

FIG. 10 is a side view schematically showing the sheet detection piece 31, the swing cam 26, the intermediate rotary member 27, the rotary member 28, and the rotational position sensor 29, in a state where the switching nails 18 have been shifted from the first transport position HS1 to the second transport position HS2. FIG. 11A and FIG. 11B are a side view and a plan view respectively, showing the sheet detection piece 31, the swing cam 26, the intermediate rotary member 27, the rotary member 28, and the rotational position sensor 29, in the state shown in FIG. 10.

As shown in FIG. 10, FIG. 11A, and FIG. 11B, the switching nails 18 rotate in the counterclockwise direction about the shaft 24, thereby moving from the first transport position HS1 to the second transport position HS2. The second lever 22 fixed to the other end portion of the shaft 24 also rotates in the counterclockwise direction, together with the switching nail 18, thereby contacting the first contact piece 27A of the intermediate rotary member 27, thus pushing the same.

The first contact piece 27A rotates in the clockwise direction about the shaft 27C, and therefore the second contact piece 27B of the intermediate rotary member 27 also rotates in the clockwise direction. Then the second contact piece 27B contacts the peripheral edge 26B of the swing cam 26, thereby pushing the swing cam 26. Accordingly, the swing cam 26 rotates in the clockwise direction, about the shaft 26A.

Because of the rotation of the swing cam 26 in the clockwise direction, the peripheral edge 26C of the swing cam 26 pushes the contact bar 28B formed at the lower end of the rotary member 28. Accordingly, the rotary member 28 rotates in the clockwise direction about the shaft 28A, so that the detection piece 28C at the upper end of the rotary member 28 moves out of the region between the light emitting element and the photodetector of the rotational position sensor 29.

The rotational position sensor 29 no longer detects the presence of the detection piece 28C at the upper end of the rotary member 28, which has gone out of the region between the light emitting element and the photodetector.

Therefore, when the switching nails 18 are set at the first transport position HS1, and the recording sheet P is not being transported through the first transport route 8, as shown in FIG. 6, FIG. 7A, and FIG. 7B, the rotational position sensor 29 detects the presence of the detection piece 28C, formed at the upper end of the rotary member 28. On the other hand, when the switching nails 18 are set at the first transport position HS1, and the recording sheet P is being transported through the first transport route 8, as shown in FIG. 8, FIG. 9A, and FIG. 9B, and also when the switching nails 18 are shifted to the second transport position HS2 from the first transport position HS1, as shown in FIG. 10, FIG. 11A, and FIG. 11B, the rotational position sensor 29 does not detect the detection piece 28C formed at the upper end of the rotary member 28.

Figure 12:
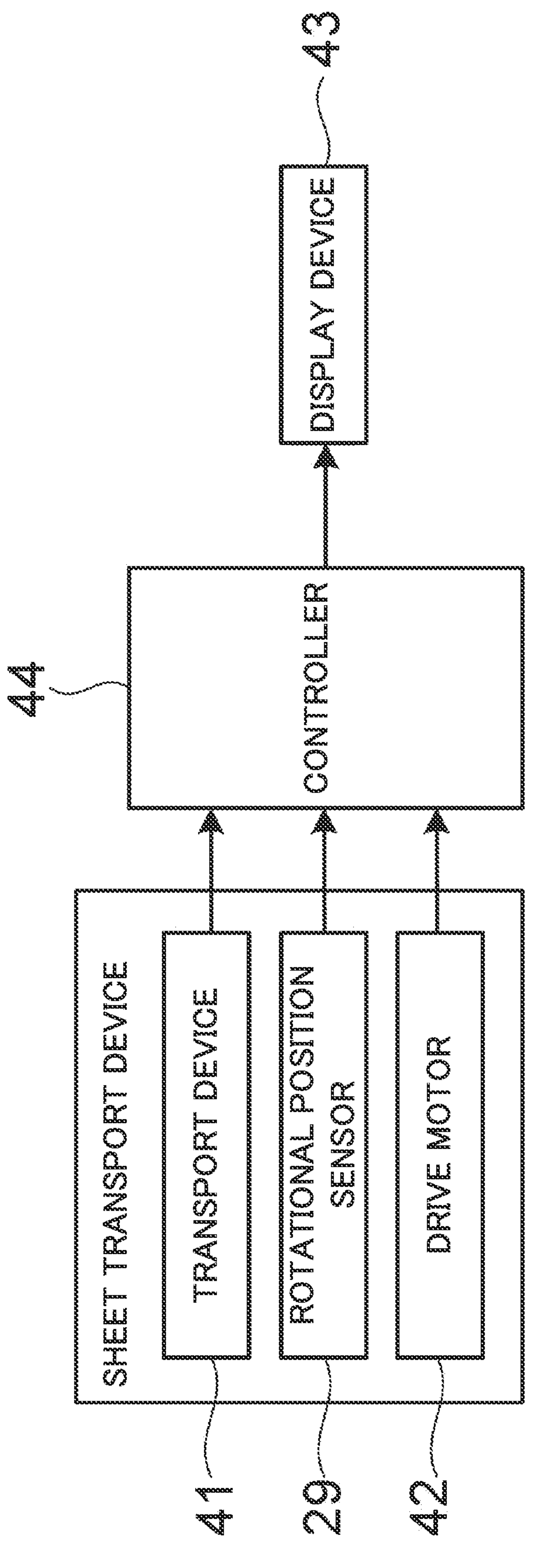
FIG. 12 is a block diagram schematically showing a configuration of a control system of the sheet transport device.

FIG. 12 is a block diagram schematically showing a configuration of a control system of the sheet transport device 20. As shown in FIG. 12, the sheet transport device 20 includes a transport device 41 that transports the recording sheet P through the first transport route 8 or the second transport route 9, a drive motor 42 that rotates the shaft 23A of the rotary cam 23, the rotational position sensor 29, a display device 43, and a controller 44.

The transport device 41 serves to control the transport rollers on the first transport route 8 and the second transport route 9, a motor for rotating the delivery roller 16, a clutch, and so forth, thereby transporting the recording sheet P through the first transport route 8 or the second transport route 9. The drive motor 42 rotates the rotary cam 23, thereby locating the switching nails 18 at the first transport position HS1 or the second transport position HS2. The rotational position sensor 29 detects the presence of the detection piece 28C formed at the upper end of the rotary member 28, located in the region between the light emitting element and the photodetector of the rotational position sensor 29.

The controller 44 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The controller 44 controls the transport device 41, so as to transport the recording sheet P through the first transport route 8 or the second transport route 9. The controller 44 also controls the drive motor 42, to locate the switching nails 18 at the first transport position HS1 or the second transport position HS2. Further, the controller 44 decides whether the detection piece 28C formed at the upper end of the rotary member 28 has been detected, on the basis of the detection output from the rotational position sensor 29.

Now, in order to properly control the transport operation of the recording sheet P by the sheet transport device 20, it is necessary to detect the presence of the recording sheet P being transported through the first transport route 8, and the position of the switching nails 18. However, employing two sensors to detect the presence of the recording sheet P and the position of the switching nails 18 respectively, leads to an increase in manufacturing cost.

With the sheet transport device 20 according to this embodiment, in contrast, although the rotational position sensor 29 is the only sensor provided, the rotational position sensor 29 enables both of the presence of the recording sheet P being transported through the first transport route 8, and the position of the switching nails 18, to be decided.

Figure 13:
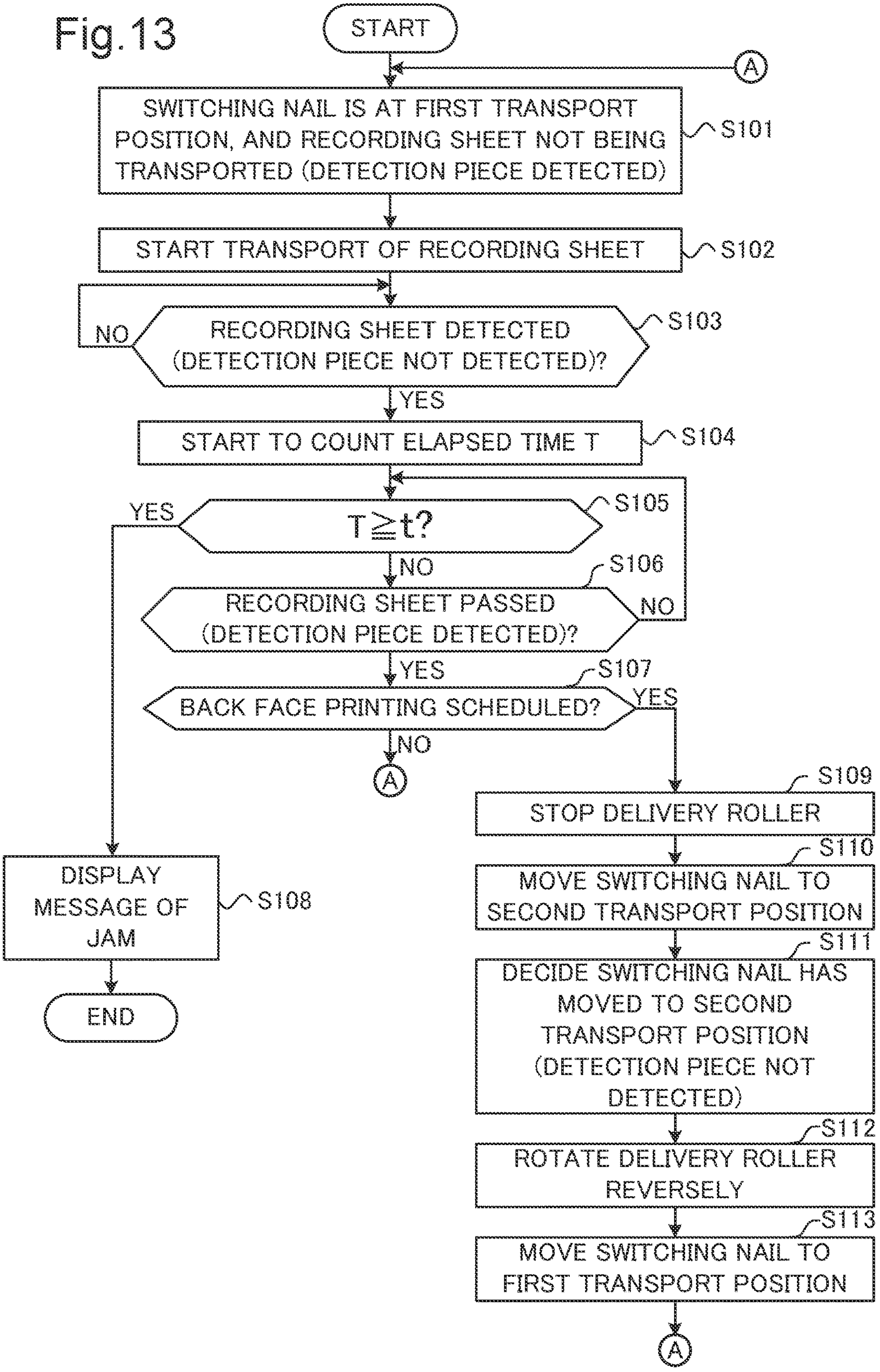
FIG. 13 is a flowchart showing a control process of a sheet transport operation.

Hereunder, a control process of the sheet transport operation, including deciding whether the recording sheet P is being transported through the first transport route 8, and deciding the position of the switching nails 18, will be described with reference to a flowchart shown in FIG. 13.

The controller 44 decides, in the state where the switching nails 18 are set at the first transport position HS1, and the recording sheet P is not being transported through the first transport route 8, as shown in FIG. 6, FIG. 7A, and FIG. 7B, that the detection piece 28C formed at the upper end of the rotary member 28 has not been detected, on the basis of the detection output from the rotational position sensor 29 (step S101). The controller 44 causes the transport device 41 to start to transport the recording sheet P (step S102).

The controller 44 stands by, until the distal end portion of the sheet detection piece 31 is contacted by the recording sheet P thus to be lifted up, as shown in FIG. 8, FIG. 9A, and FIG. 9B, and the rotational position sensor 29 stops detecting the detection piece 28C of the rotary member 28 (No at step S103). When the detection piece 28C of the rotary member 28 stops being detected, in other words when the leading edge of the recording sheet P is detected (Yes at step S103), the controller 44 starts to count an elapsed time T (step S104).

The controller 44 decides whether the elapsed time T is equal to or longer than a prespecified time t (step S105). The controller 44 also decides whether the detection piece 28C of the rotary member 28 has been again detected, in other words whether the trailing edge of the recording sheet P has passed the position corresponding to the distal end portion of the sheet detection piece 31 (step S106). The prespecified time t corresponds to the time until the distal end portion of the sheet detection piece 31 returns to the initial position, after being contacted by the recording sheet P thus to be lifted up, in other words the time required for the recording sheet P to pass the position corresponding to the distal end portion of the sheet detection piece 31, which is specified in advance, on the basis of the length of the recording sheet P and the transport speed thereof.

For example, when the detection piece 28C of the rotary member 28 is detected (Yes at step S106), before the elapsed time T reaches the prespecified time t (No at step S105), it can be assumed that the recording sheet P has been normally transported, and that the distal end portion of the sheet detection piece 31 has returned to the initial position, as shown in FIG. 6, FIG. 7A, and FIG. 7B. Therefore, the controller 44 decides whether the printing is to be also performed on the back face of the recording sheet P (step S107). Upon deciding that the printing on the back face of the recording sheet P is not scheduled (No at step S107), the controller 44 returns to step S101.

In contrast, when the elapsed time T reaches or exceeds the prespecified time t (Yes at step S105), without the detection piece 28C of the rotary member 28 having been detected (No at step S106), the controller 44 causes the display device 43 to display a message notifying occurrence of paper jam (step S108). This is because it is highly likely that the recording sheet P has not been normally transported and the paper jam has occurred, when the elapsed time T reaches or exceeds the prespecified time t, and therefore the controller 44 suspends the operation of the sheet transport device 20, and causes the display device 43 to display the message to the effect that the paper jam has occurred. After step S108, the controller 44 finishes the sheet transport operation shown in FIG. 13.

In contrast, upon deciding that the printing on the back face of the recording sheet P is scheduled (Yes at step S107), the controller 44 controls the transport device 41 so as to stop the rotation of the delivery roller 16, at the time point that the detection piece 28C of the rotary member 28 has been again detected, in other words a predetermined first time after the trailing edge of the recording sheet P passed the position corresponding to the distal end portion of the sheet detection piece 31 (step S109).

The controller 44 controls the drive motor 42 so as to rotate by a predetermined rotation angle, to thereby cause the rotary cam 23 to rotate by 180 degrees as shown in FIG. 4B. As result, the switching nails 18 are moved from the first transport position HS1 to the second transport position HS2, as shown in FIG. 10, FIG. 11A, and FIG. 11B (step S110).

In this process, the rotational position sensor 29 suspends detecting the detection piece 28C of the rotary member 28, and therefore the controller 44 decides that the switching nails 18 have been moved to the second transport position HS2 (step S111). Further, the controller 44 controls the transport device 41 so as to cause the delivery roller 16 to rotate reversely (step S112), thereby conducting the recording sheet P from the delivery roller 16 to the second transport route 9. As result, the recording sheet P is subjected to the switchback transport.

When a predetermined second time elapses after the delivery roller 16 is made to rotate reversely, the controller 44 causes the delivery roller 16 to stop rotating, and again causes the drive motor 42 to rotate by the predetermined rotation angle, thereby causing the rotary cam 23 to rotate by 180 degrees and return to the initial position, as shown in FIG. 4A. As result, the switching nails 18 are moved from the second transport position HS2 to the first transport position H1, as shown in FIG. 6, FIG. 7A, and FIG. 7B (step S113). After step S113, the controller 44 returns to step S101.

Now, with the aforementioned existing sheet transport device including a plurality of transport routes, and in which the branch nail switches the transport route through which the sheet is to be transported, it is necessary to detect the position of the recording sheet being transported through the transport route, and the posture of the branch nail. Accordingly, the structure required for such detection becomes complicated. To be more specific, the numbers of the motors, solenoids, and sensors are increased, which naturally leads to an increase in manufacturing cost.

On the other hand, according to the foregoing embodiment, the presence of the recording sheet P being transported through the first transport route 8, and the position of the switching nails 18 can be decided, using the second lever 22, the swing cam 26, the intermediate rotary member 27, the rotary member 28, and the rotational position sensor 29, which are fixed to the shaft 24 of the switching nails 18. Such a configuration eliminates the need to provide additional sensors, thereby contributing to reducing the cost.

In other words, with the configuration according to the foregoing embodiment, the position of the recording sheet P being transported through the first transport route 8, and the position of the switching nails 18, can be detected with a simplified structure compared with the conventional structure, in the mechanism for switching the transport direction of the sheet.

The configurations and processings according to the foregoing embodiment, described with reference to FIG. 1 to FIG. 13, are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A sheet transport device comprising:

a first transport route that guides a sheet;

a roller that transports the sheet guided through the first transport route;

a second transport route that guides the sheet transported in an opposite direction by reverse rotation of the roller;

a switching nail supported by a first shaft parallel to a rotary shaft of the roller, to be set, by being made to reciprocatively rotate about the first shaft, to one of a first transport position for conducting the sheet guided through the first transport route to the roller, and a second transport position for conducting the sheet transported in the opposite direction by the reverse rotation of the roller, to the second transport route;

a lever protruding from the first shaft, in a direction orthogonal to the first shaft;

a sheet detection piece rotatably supported by a second shaft parallel to the first shaft, and protruding to the first transport route, the sheet detection piece being configured to retreat from the first transport route by rotating about the second shaft, upon being contacted by the sheet transported through the first transport route;

a cam connected to the sheet detection piece via the second shaft, to rotate about the second shaft together with the sheet detection piece, when the sheet detection piece retreats from the first transport route;

an intermediate rotary member rotatably supported by a third shaft parallel to the first shaft, to rotate, when the switching nail is switched to the second transport position and the first shaft and the lever rotate, about the third shaft by being contacted by the rotating lever, thereby contacting the cam and causing the cam to rotate;

a rotary member rotatably supported by a fourth shaft parallel to the first shaft, to rotate, when the sheet detection piece retreats from the first transport route and the cam rotates, and when the switching nail is switched to the second transport position and the cam rotates, about the fourth shaft by being contacted by the rotating cam, and be displaced between a first posture of being spaced from the cam, and a second posture of being in contact with the cam;

a sensor that detects that the rotary member is in the second posture of being in contact with the cam;

a driver that switches the switching nail to one of the first transport position and the second transport position, by causing the switching nail to reciprocatively rotate about the first shaft; and a controller including a processor, and configured, when the processor executes a control program, to:

switch the switching nail to one of the first transport position and the second transport position, by controlling the driver;

decide that the sheet is transported through first transport route, when the sheet detection piece retreats by being contacted by the sheet transported through the first transport route, with the switching nail being set to the first transport position, and the sensor detects that the rotary member is in the second posture; and decide that the switching nail has been switched from the first transport position to the second transport position, when the sensor detects that the rotary member is in the second posture, after the sheet has passed the sheet detection piece.

2. The sheet transport device according to claim 1, wherein the controller decides that jam has occurred, when the sensor keeps detecting that the rotary member is in the second posture, for a prespecified time or longer, with the switching nail being switched to the first transport position.

3. The sheet transport device according to claim 2, wherein the controller calculates the prespecified time, on a basis of a length of the sheet in a transport direction, and transport speed of the sheet.

4. The sheet transport device according to claim 1, wherein the controller decides that the sheet has passed a position corresponding to the sheet detection piece, when the sensor detects that the rotary member is in the first posture, with the switching nail being switched to the first transport position.

5. An image forming apparatus comprising:

the sheet transport device according to claim 1; and an image forming device that forms an image on the sheet transported by the sheet transport device.

* * * * *